Figure 1:
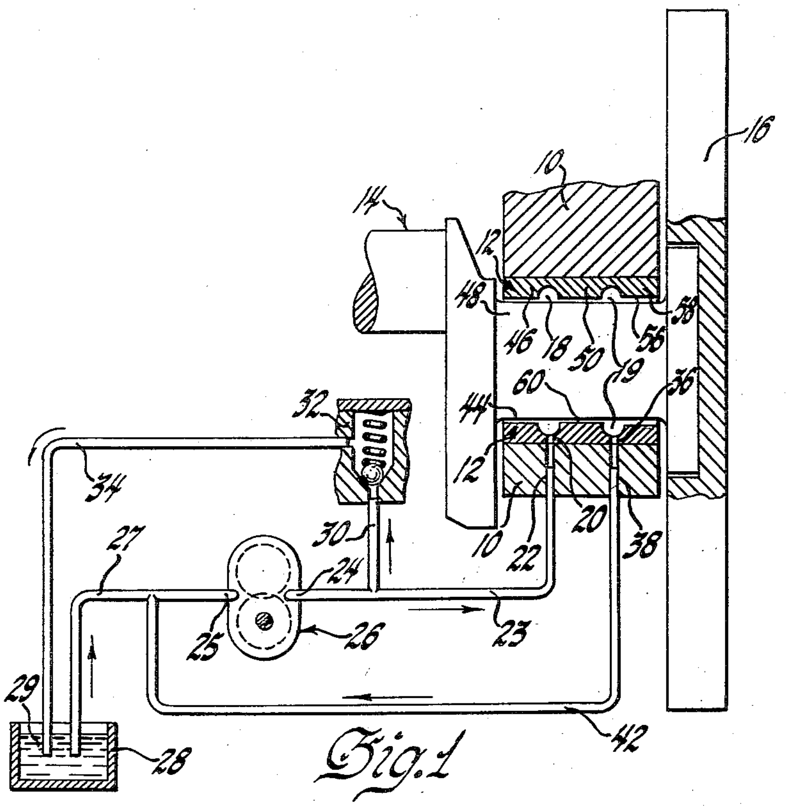

March 18, 1958 A. E. ROACH 2,827,342

BEARING CONSTRUCTION

Filed Dec. 15, 1955

INVENTOR

Arvid E. Roach, deceased,
Alda Elizabeth Roach, Administratrix

BY S. E. Ross

ATTORNEY

United States Patent Office 2,827,342

Patented Mar. 18, 1958

2,827,342

BEARING CONSTRUCTION

Arvid E. Roach, deceased, late of Detroit, Mich., by Alda Elizabeth Roach, administratrix, Detroit, Mich., assignor to General Motors Corporation, Detroit, Mich., a corporation of Delaware Application December 15, 1955, Serial No. 553,376

11 Claims. (Cl. 308—122)

This invention relates to an apparatus for lubricating rotatable shafts and particularly to a bearing and journal arrangement which prevents lubricating oil leakage and reduces friction in an internal combustion engine.

Leakage of lubricating oil from rear main bearings of internal combustion engines is conventionally reduced by using packings or oil seals. Although such constructions normally are quite effective in reducing oil leakage, they measurably increase engine friction. Recent tests with single-cylinder engines have shown that a conventional oil seal between the rear main bearing and the flywheel is responsible for approximately 30% of the engine friction at part load and for up to about 16% at full load. Of course, the percentage of power loss due to friction in the rear main bearing of a multi-cylinder engine is considerably less. Nevertheless, the friction at this location is substantial, and it is estimated that it constitutes approximately 5% of the total engine friction at part load and about 3% at full load.

Accordingly, a principal object of this invention is to provide a bearing construction and arrangement of associated parts which will prevent leakage of lubricating oil from a rear main bearing of an internal combustion engine without the use of the usual packing or oil seal. A further object of the invention is to provide a simple and inexpensive apparatus for lubricating an engine shaft and bearing in a manner which substantially reduces power losses due to friction at this bearing location.

In accordance with the present invention, the above and other objects are attained with a bearing construction and sealing arrangement in which lubricating oil is fed under pressure to the bearing surface and thereafter evacuated from another portion of the bearing to eliminate the need for conventional seals to prevent leakage of the lubricant. Specifically, a circumferential groove is provided in the working surface of a sleeve bearing and connected to an oil pump which delivers the lubricant under pressure to the bearing surface. A second circumferential groove is formed in the bearing nearer the outer end of the shaft or journal and connected to the suction side of the oil pump, thereby causing the lubricant to flow across the surface of the bearing and to be drained therefrom. The draining action of the second or evacuating groove in conjunction with predetermined clearances between the journal and the formed bearing lands prevents leakage of the lubricant. Bearing lands on either side of the groove which contains the oil under pressure constitute the principal load-carrying portions of the bearing, while the remaining land between the evacuating groove and the adjacent end of the shaft functions as a sealing land for the lubricant. The clearance between this sealing land and the journal is slightly larger than the clearance between the load-carrying lands and the journal.

Figure 2:
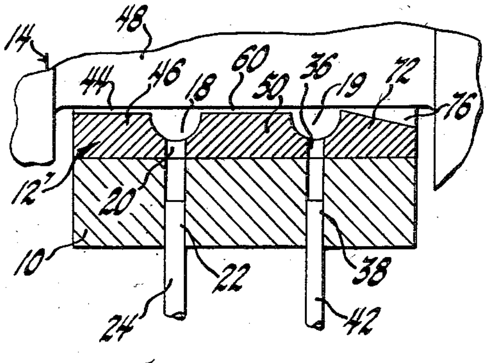

Other objects and advantages of this invention will more fully appear from the following detailed description of preferred embodiments thereof, reference being made to the accompanying drawing in which:

Figure 1 is a schematic view, with parts broken away and in section, showing a rear main bearing of an internal combustion engine and the parts associated therewith; and Figure 2 is an enlarged fragmentary sectional view of a modification of the bearing shown in Figure 1.

Referring more particularly to the drawing, Figure 1 shows a portion of a gasoline engine having a cylinder block wall or rear end bearing support 10 in which a rear main bearing sleeve 12 is suitably fixed. A crankshaft, indicated generally by the reference numeral 14, is rotatably mounted in the bearing sleeve. Secured to the rear end of the crankshaft in conventional manner is a flywheel 16.

In accordance with the invention, the rear main bearing sleeve 12 is provided with a pair of annular grooves 18 and 19 which circumscribe its inner working surface. An opening or passage 20 extends radially from the base of the forward groove 18 through the bearing sleeve and communicates with a duct 22 in the wall 10 of the cylinder block. In turn, the duct 22 is connected by a suitable pipe line or tube 23 to the outlet side 24 of an oil pump 26. The intake 25 of this pump is connected by pipe line 27 to an appropriate sump or reservoir 28 for the lubricating oil 29.

Another pipe line or tube 30 is connected to the line 23 at a point between the bearing 12 and the oil pump 26. The opposite end of pipe line 30 is connected to the intake of a relief valve mechanism 32, while the outlet of the relief valve is connected by pipe line 34 to the sump 28.

A passage 36, which extends radially from the rearward annular groove 19 through the bearing sleeve 12, likewise registers with a duct 38 in the cylinder block wall 10. A suitable pipe line or tube 42 is shown as having one end secured in the passage 38 and its other end connected to the line 27 between the oil pump and the sump.

Under operating conditions of the engine the pump 26 delivers lubricating oil under pressure from the reservoir or sump 28, through pipe lines 27 and 23, duct 22 and passage 20, to the forward annnular groove 18 in the bearing sleeve. As will be hereinafter more fully explained, the clearance 44 between the forward land 46 of the bearing and the cooperating journal portion 48 of the crankshaft is preferably very small and does not readily accommodate passage of any appreciable quantity of lubricating oil from the forward circumferential groove 18 to the adjacent end of the bearing. Nevertheless, since the oil in this groove is under pressure, a sufficient amount of it is forced into the clearance space 44 to satisfactorily lubricate the adjacent surfaces of the journal and the bearing land 46. It is preferable to supply the lubricating oil in the forward groove at a pressure of approximately 15 to 30 p. s. i.

Since the rearward annular groove 19 in the bearing is connected by opening 36, duct 38, and pipe lines 42 and 27 to the intake of the pump 26, this groove is maintained at sub-atmospheric pressure. This partial vacuum in the groove 19 draws or sucks the lubricating oil from the forward annular groove 18 across the working surface of the ecntral or main land 50 of the bearing and into the groove 19. In turn, the oil drawn into this evacuating groove is pumped through the pipe lines 42 and 27 back to the intake 25 of the pump. The direction of flow of the oil in lines 27, 23 and 42 is indicated by the arrows in Figure 1.

The sub-atmospheric pressure of the lubricating oil in the annular evacuating groove 19 substantially eliminates rearward flow of oil from this groove through the clearance space 56 between the journal 48 and the rear end land 58 of the bearing. Consequently, there is little or no oil leakage between the cylinder block wall 10 and the flywheel. As hereinafter described in greater detail, the clearance 56 is relatively large as compared with the clearances 44 and 60 between the bearing lands 46 and 50, respectively, and the journal. The lands 46 and 50 therefore constitute the principal load-carrying surfaces of the bearing sleeve, while the land 58 functions primarily as a partial seal for the lubricating oil. It will be appreciated, of course, that the sizes of the various clearance spaces between the journal and the bearing sleeve are greatly exaggerated in the drawing for purposes of clarity.

The relief valve 32 may be merely a conventional type of ball valve, as shown in Figure 1. This valve permits the lubricating oil in pipe line 23 to be circulated through lines 30 and 34 to the sump 28 in the event the pressure in oil line 23 becomes excessive.

As hereinbefore indicated, the load-carrying lands 46 and 50 of the bearing extend radially outwardly a somewhat greater distance than the sealing land 58. In the case of a shaft having a journal diameter of 2 5/16 inches, for example, the diametral clearances 44 and 60 between the lands 46 and 50, respectively, and the journal 48 each is preferably approximately 0.0015 inch. On the other hand, the diametral clearance 56 between the sealing land 58 and the journal 48 is sufficiently greater than the clearances 44 and 60 to insure that there will be no appreciable metallic contact between land 58 and the journal. Of course, the clearance 56 must be sufficiently small to prevent any material leakage of air into groove 19. Hence it is frequently desirable to form the clearance 56 approximately two or three times as large as the clearances 44 and 60. However, under particular circumstances the clearance 56 may be five or even ten times greater than clearances 44 and 60. In the case of a journal having a diameter of 2 5/16 inches, a sealing land clearance of 0.0045 inch to 0.0080 inch is satisfactory. Generally, therefore, the size of this clearance should be three to five times the size of clearances 44 and 60.

In order to compute the proper sizes of clearances adjacent bearing lands 46 and 50 for various journal diameters, the formula $C = (0.00065 \pm 0.0001)D$ may be employed. In this formula C is the size in inches of the clearance 44 or 60, while D is the diameter of the shaft in inches. While this formula provides the preferred ranges of diametral clearances between the load-carrying bearing lands and the journal, these clearances may be somewhat larger than provided by the formula in many instances. Hence, acceptable results frequently may be obtained by application of the formula $$C = (0.00065 \pm 0.0005)D$$

where C and D are the same as in the previous formula.

The clearance sizes provided by the first-mentioned preferred formula are particularly applicable for bearings with babbit, tri-plate or co-plate surfaces. However, copper-lead and silver bearings normally require greater clearances by a factor of approximately 10% to 50% and occasionally even more, depending on the engine speed. In the latter instances it is frequently advisable to calculate the clearances adjacent the load-carrying lands by application of the second formula and to select clearance size figures near the upper end of the range obtained thereby.

In addition, it is sometimes advantageous to provide the sealing land with a conical surface, as shown in Figure 2, rather than with a cylindrical surface. In this modification of the invention, the bearing sleeve 12' and adjacent parts are generally similar to the construction shown in Figure 1. However, in the Figure 2 modification the rear end or sealing land 72 is tapered radially inwardly from the evacuating groove 19 toward the rear end of the bearing 14, thereby providing the inner surface of this land with a generally conical configuration. Of course, the surface of the land 72 may be convex with respect to the longitudinal axis of the bearing rather than conical. In either event the diameter of the sealing land is reduced toward the rear end of the bearing to provide a bell mouth in which the clearance 76 between the tapered land 72 and the journal varies, for example, from about 0.0015 inch at the forward edge of the land to approximately 0.0045 to 0.0080 inch at the rearward edge. These figures are typical for a shaft or journal having a diameter of approximately 2 5/16 inches. The formulae listed above also apply to a bearing provided with a tapered sealing land, and the average clearance 76 is preferably two to five times as great as the clearances at the load-carrying lands 46 and 50.

While the above invention has been described by means of certain specific examples, it will be understood that the scope of the invention is not to be limited thereby except as defined in the following claims.

What is claimed is:

1. In combination, a plain bearing having a pair of axially spaced circumferential grooves in its working surface, a rotary shaft carried in said bearing, a reservoir for containing a lubricant, a pump for said lubricant, a pipe line connecting said reservoir with one of said grooves and with the intake of said pump, and a second pipe line connecting the outlet of said pump with the other of said grooves, thereby permitting said pump to force said lubricant from said reservoir to said other groove and to draw said lubricant across the working surface of said bearing to said first groove and thence to the intake of said pump.

2. In combination, a journal bearing having a circumferentially extending annular groove in its working surface for receiving lubricating oil, a pump for said lubricating oil, a radially extending passage in said bearing connecting said groove with the outlet of said pump for supplying lubricating oil under pressure thereto, a reservoir for said lubricating oil connected to the inlet of said pump, a second annular groove circumscribing the working surface of said bearing, and a conduit connecting said second groove with the inlet of said pump for removing said lubricating oil from said second groove, said pump being adapted to deliver oil under pressure above that of atmospheric pressure to said first groove and to reduce the pressure in said second groove to cause said lubricating oil to flow axially from said first groove over a working surface of said bearing to said second groove.

3. In combination, a plain bearing having a pair of axially spaced circumferential grooves in its working surface dividing said surface into three generally coaxial lands, a rotary shaft carried in said bearing, a reservoir containing a lubricant, a pump for said lubricant, a pipe line connecting said reservoir with one of said grooves and with the intake of said pump, and a second pipe line connecting the outlet of said pump with the other of said grooves, thereby permitting said pump to force said lubricant from said reservoir to said second groove and to draw said lubricant across the working surface of said bearing to said first groove and thence to the intake of said pump, the average clearance between said shaft and the land intermediate said second groove and the adjacent end of said bearing being larger than the average clearance between said shaft and the other of said lands.

4. The combination set forth in claim 3 in which the land intermediate the second groove and the adjacent end of the bearing tapers radially inwardly from said groove toward said end.

5. In an internal combustion engine, the combination of a cylinder block, a rear main bearing sleeve secured within a wall of said cylinder block, a crankshaft having a journal portion rotatably mounted in said bearing sleeve, a flywheel secured to one end of said crankshaft and rotatable therewith, said bearing sleeve having a pair of axially spaced circumferential grooves in its working surface dividing said surface into three coaxial annular bearing lands, the land nearest said flywheel constituting a sealing land for said lubricating oil and the other two lands constituting load-carrying lands for said bearing, a reservoir for containing lubricating oil, and a pump connected to said grooves and said reservoir for forcing said lubricating oil under pressure above atmospheric pressure to one of said grooves and for removing oil at a pressure below atmospheric pressure from the other of said grooves, the average clearance between said journal portion and said sealing land being larger than the average clearance between said journal portion and said load-carrying lands.

6. The combination set forth in claim 5 in which the average clearance in inches between the journal portion of the crankshaft and load-carrying lands of the bearing equals (0.00065±0.0005) times the average diameter of said journal portion in inches.

7. In an internal combustion engine, the combination of a cylinder block, a rear main bearing sleeve secured within a wall of said cylinder block, a crankshaft having a journal portion rotatably mounted in said bearing sleeve, a flywheel secured to one end of said crankshaft and rotatable therewith, said bearing sleeve having a pair of axially spaced circumferential grooves in its working surface dividing said surface into three coaxial annular bearing lands, a reservoir for containing lubricating oil, a pump for said lubricating oil, a pipe line connecting the base of one of said grooves with the outlet of said pump, a pressure relief valve located between said pipe line and said reservoir and in fluid connection therewith, and a second pipe line connecting said reservoir with the intake of said pump and with the base of the other of said grooves, the average clearance between said journal and the land nearest said flywheel being two to five times as large as the average clearance between said journal and each of said other two lands.

8. The combination set forth in claim 7 in which the average clearance between the journal portion of the crankshaft and the land nearest the flywheel is approximately 0.0045 inch to 0.0080 inch.

9. In an internal combustion engine, the combination of a cylinder block, a rear main bearing sleeve secured within a wall of said cylinder block, said bearing sleeve having a pair of axially spaced circumferential grooves in its working surface dividing said surface into three generally coaxial annular bearing lands, a crankshaft having a journal portion rotatably mounted in said bearing sleeve, a flywheel secured to the rearward end of said crankshaft and rotatable therewith, a reservoir for containing lubricating oil, and a pump connected to said grooves and said reservoir for forcing said lubricating oil under pressure above atmospheric pressure to the more forward of said grooves and for removing oil at a pressure below atmospheric pressure from the more rearward of said grooves, the land between said flywheel and said rearward groove being tapered radially inwardly from said groove toward said flywheel, the other of said lands being of generally cylindrical shape.

10. The construction set forth in claim 9 in which the average clearance in inches between the journal portion of the crankshaft and the generally cylindrical lands equals (0.00065±0.0005) times the average diameter of said journal portion in inches, and where the average clearance between said journal portion and said tapered land is two to five times as large as the average clearance between said journal portion and said generally cylindrical lands.

11. In combination, a plain bearing having a pair of axially spaced circumferential grooves in its working surface, a journal member rotatably supported by said bearing, pump means for supplying lubricant to said bearing, pipe lines connecting one of said grooves to the intake of said pump and the other of said grooves to the outlet of said pump means, a reservoir for containing said lubricant communicating with said pipe lines, thereby permitting said pump means to force said lubricant to one of said grooves and to cause said lubricant to flow axially across the working surface of said bearing to the other of said grooves.

References Cited in the file of this patent

UNITED STATES PATENTS

| | | |
|---|---|---|
| 2,155,218 | Cain | Apr. 18, 1939 |
| 2,402,467 | Thompson | June 18, 1946 |
| 2,571,166 | Rossetto | Oct. 16, 1951 |